United States Patent
Payton

(10) Patent No.: US 7,654,320 B2
(45) Date of Patent: Feb. 2, 2010

(54) SYSTEM AND METHOD FOR PROCESSING A MIXTURE OF HYDROCARBON AND CO2 GAS PRODUCED FROM A HYDROCARBON RESERVOIR

(75) Inventor: Thomas J. Payton, Houston, TX (US)

(73) Assignee: Occidental Energy Ventures Corp., Houston, TX (US)

(*) Notice: Subject to any disclaimer, the term of this patent is extended or adjusted under 35 U.S.C. 154(b) by 235 days.

(21) Appl. No.: 11/726,597

(22) Filed: Mar. 22, 2007

(65) Prior Publication Data

US 2007/0237696 A1 Oct. 11, 2007

Related U.S. Application Data

(60) Provisional application No. 60/790,153, filed on Apr. 7, 2006.

(51) Int. Cl.
*E21B 43/40* (2006.01)

(52) U.S. Cl. .................... 166/257; 166/256; 166/251.1; 166/261; 166/266; 166/268

(58) Field of Classification Search ................. 166/256, 166/251.1, 257, 261, 266, 268; 60/39.6
See application file for complete search history.

(56) References Cited

U.S. PATENT DOCUMENTS

| | | | |
|---|---|---|---|
| 3,075,918 A | | 1/1963 | Holm |
| 4,202,168 A | * | 5/1980 | Acheson et al. ............... 60/777 |
| 4,250,962 A | | 2/1981 | Madgavkar et al. |
| 4,344,486 A | | 8/1982 | Parrish |
| 4,434,613 A | | 3/1984 | Stahl |
| 4,733,526 A | | 3/1988 | Garrett |
| 6,505,683 B2 | | 1/2003 | Minkkinen et al. |
| 6,622,470 B2 | | 9/2003 | Viteri et al. |
| 6,637,183 B2 | | 10/2003 | Viteri et al. |
| 6,820,689 B2 | | 11/2004 | Sarada |
| 6,824,710 B2 | * | 11/2004 | Viteri et al. .................. 252/373 |
| 6,853,921 B2 | | 2/2005 | Thomas et al. |
| 2002/0038710 A1 | * | 4/2002 | Maher et al. ............. 166/251.1 |
| 2004/0154793 A1 | | 8/2004 | Zapadinski |

FOREIGN PATENT DOCUMENTS

GB 2117053 10/1983

(Continued)

OTHER PUBLICATIONS

Blizzard G. et al.; "Mallet Gas Processing Facility Uses Membranes to Efficiently Separate $CO_2$"; Oil and Gas Journal; Apr. 11, 2005.

(Continued)

*Primary Examiner*—David J Bagnell
*Assistant Examiner*—Brad Harcourt
(74) *Attorney, Agent, or Firm*—Fish & Richardson P.C.

(57) ABSTRACT

A system and method is disclosed for treating a mixture of hydrocarbon and carbon dioxide gas produced from a hydrocarbon reservoir. The system includes a gas power turbine adapted to burn the produced gas mixture of hydrocarbon and carbon dioxide gas with oxygen as an oxidizing agent and a capture system to collect the exhaust gas from the power turbine. An inlet compressor receives exhaust gas from the capture system and compresses the exhaust gas for injection of the exhaust gas into a hydrocarbon reservoir and for recycle to the power turbine. The system may further include a membrane system that preferentially removes carbon dioxide and hydrogen sulfide from the produced gas stream before said stream is used as fuel gas in the power turbine. The carbon dioxide and hydrogen sulfide removed by the membrane system is combined with the exhaust gas, and the combined gas is injected into a hydrocarbon reservoir.

26 Claims, 3 Drawing Sheets

FOREIGN PATENT DOCUMENTS

| | | |
|---|---|---|
| GB | 2140873 | 12/1984 |
| WO | WO 95/21683 | 8/1995 |
| WO | WO 01/61167 | 8/2001 |

OTHER PUBLICATIONS

Brdar, R.D. et al.; "GE IGCC Technology and Experience with Advanced Gas Turbines"; GER-4207; GE Power Systems; Schenectady, New York; Oct. 2000.

Kovarik, F.S.; "A Minimum Miscibility Pressure Study Using Impure $CO_2$ and West Texas Oil Systems: Data Base, Correlations, and Compositional Simulation"; Society of Petroleum Engineer Production Technology Symposium; Nov. 1985.

Roberts, S.K. et al.; "Semi-Closed Cycle $O_2/CO_2$ Combustion Gas Turbines: Influence of Fluid Properties on the Aerodynamic Performance of the Turbomachinery"; ASME GT-2002-30410; Proceedings of ASME Turbo Expo 2002; Amsterdam, The Netherlands; Jun. 3-6, 2002.

Sjolander, S.A. et al.; "Aerodynamic Performance of Turbomachinery for Zero-Emission Gas Turbine Engines"; CASI $9^{th}$ Aerodynamics Symposium; Montreal, Canada; Apr. 28-30, 2003.

Ulizar, I. et al; "Handling of a Semiclosed Cycle Gas Turbine with a Carbon Dioxide-Argon Working Fluid"; Journal of Engineering for Gas Turbines and Power, 122(3); 2000; pp. 437-441.

Jackson, A.J.B., et al., "Gas Turbine Performance Using Carbon Dioxide as Working Fluid in Closed Cycle Operation," ASME 2000-GT-153, ASME Turboexpo 2000, Munich, Germany, May 8-11,2000.

Jones, R.M. et al., "IGCC Gas Turbines for Refinery Applications," GER-4219, GE Power Systems; Schenectady, New York; May 2003.

Fisher, D., "Rocket Science," http://www.forbes.com/forbes/2003/0811/088_print.html, May 7, 2005.

"IGCC Benefits Making Environmental Compliance Affordable," http://www.gepower.com/prod_serv/products/gas_turbines_cc/en/igcc/benefits.htm, Apr. 30, 2005.

"MS7001EA Gas Turbine Time-Tested," http://www.gepower.com/prod_serv/products/gas_turbines_cc/en/midrange/ms7001ea.htm, Apr. 30, 2005.

"MS6001B Gas Turbine Reliable & Rugged," http://www.gepower.com/prod_serv/products/gas_turbines_cc/en/midrange/ms6001b.htm, Apr. 30, 2005.

"MS6001C Gas Turbine High Efficiency," http://www.gepower.com/prod_serv/products/gas_turbinescc/en/midrange/ms6001c.htm, Apr. 30, 2005.

"MS6001FA Gas Turbine Proven Performance," http://vvww.gepower.com/prod_serv/products/gas_turbines_cc/en/f_class/ms6001fa.htm, Apr. 30, 2005.

"MS7001FA Gas Turbine Wide Range of Applications," http://www.gepower.com/prod_serv/products/gas_turbines_cc/en/f_class/ms7001fa.htm, Apr. 30, 2005.

"IGCC The Next Generation Power Plant," http://www.gepower.com/prod_serv/products/gas_turbines_cc/en/igcc/index.htm.

Foster, A.D. et al., "Fuels Flexibility in Heavy-Duty Gas Turbines," GE Company, Schenectady, New York, 1983.

"Norwegian Government Supports Development of New $CO_2$-Capture Power Plants," Greenhouse Issues, Jul. 2004.

"Carbon Dioxide for the Recovery of Crude Oil, a Literature Search to Jun. 30, 1979-Final Report," DOE/BETC/5785-1; Department of Energy, May 1980.

International Preliminary Report on Patentability issued in corresponding International Application No. PCT/US2007/064927; Jun. 17, 2008; 23 pages.

D. Fiaschi, G. Manfrida; "A New Semi-Closed Gas Turbine Cycle with CO2 Separation"; Energy Conversion and Management; vol. 40; 1999; pp. 1669-1678.

International Search Report and Written Opinion of the International Searching Authority issued in International Application No. PCT/US2007/064927; Aug. 16, 2007; 12 pages.

Jackson, A.J.B. et al.; "Gas Turbine Engine Configurations for Power Generation Cycles Having CO2 Sequestration"; Proceedings of the I MECH E Part A Journal of Power and Energy; Feb. 1, 2004, vol. 218, No. 1; pp. 1-13.

Allaby, L. et al.; "Maximizing the Performance of Semi-Closed O2/CO2 Gas Turbine Combined Cycles for Power Generation"; Canadian Aeronautical and Space Institute 15th Propulsion Symposium; Apr. 2005; Toronto, Canada; pp. 1-15.

Ulizar, I. et al.; "Design of a Semi-Closed Cycle Gas Turbine with Carbon Dioxide-Argon as Working Fluid"; Journal of Engineering for Gas Turbines and Power; Apr. 1998; vol. 120, Issue 2; pp. 330-335.

Ulizar, I. et al.; "A Semiclosed Cycle Gas Turbine with Carbon Dioxide-Argon as Working Fluid"; Journal of Engineering for Gas Turbines and Power; Jul. 1997; vol. 119; p. 612-616.

Roberts, S.K.; "Effects of Fluid Properties on the Aerodynamic Performance of Turbomachinery for Semi-Closed Cycle Gas Turbine Engines Using O2/CO2 Combustion," M.A.Sc. (Aerospace) Thesis; Dec. 2001; Department of Mechanical and Aerospace Engineering, Carleton University, Ottawa, Canada; 208 pages.

Ulfsnes, R.E. et al.; "Modelling and Simulation of Transient Performance of the Semi-Closed O2/CO2 Gas Turbine Cycle for CO2-Capture"; Proceedings of ASME Turbo Expo 2003, Atlanta, Georgia, USA; GT2003-38068; pp. 1-10.

Iantovski, E. et al.; "Highly Efficient Zero Emission CO2-Based Power Plant"; Energy Conversion and Management; 1997; vol. 38, Supplement ; pp. S141-S146.

Mathieu Ph. et al.; "Zero-Emission Matiant Cycle"; ASME Journal of Engineering of Gas Turbines and Power; Jan. 1999; vol. 121; pp. 116-120.

Mathieu, Ph. et al.; "New Concept of CO2 Removal Technologies in Power Generation, Combined with Fossil Fuel Recovery and Long Term CO2 Sequestration"; Proceedings of the ASME Turbo Expo 2000; May 8-11,2000; Munich, Germany; ASME paper 2000-GT 160; pp. 1-8.

Houyou, S. et al.; "Techno-Economic Comparison of Different Options of Very Low CO2 Emission Technologies"; presented at the Fifth International Conference on Greenhouse Gas Control Technologies; Aug. 20001 Cairns, Australia; pp. 1-6.

De Ruyck, J.; "Efficient CO2 Capture through a Combined Steam and CO2 Gas Turbine Cycle"; Energy Conyers. Mgmt.; 1992; vol. 33, Nos. 5-8; pp. 397-403.

Imsland, L. et al.; "Modeling and Control of a O2/CO2 Gas Turbine Cycle for CO2 Capture", Proceedings of DYCOPS; 2004; Boston, Massachusetts, USA; 6 pages.

Bolland, O. et al.; "A Novel Methodology for Comparing CO2 Capture Options for Natural Gas-Fired Combined Cycle Plants"; Advanced in Environmental Research 7; 2003; pp. 901-911.

Bolland, O. et al.; "New Concepts for Natural Gas Fired Power Plants Which Simplify the Recovery of Carbon Dioxide"; Energy Conversation Management; 1992; vol. 33, No. 5-8; pp. 467-475.

Bolland, O. et al.; "Comparison of Two CO2 Removal Options in Combined Cycle Power Plants"; Energy Conversation Management; 1998; vol. 39, No. 16-18; pp. 1653-1663.

Bolland, O. et al.; "A Thermodynamic Comparison of the Oxy-Fuel Power Cycles Watercycle, Graz-Cycle and Matiant-Cycle" ;Proceedings of the International Conference on Power Generation and Sustainable Development; Oct. 8-9, 2001; Liege, Belgium; 6 pages.

Bolland, O. et al.; "A Thermodynamic Comparison of the Oxy-Fuel Power Cycles Watercycle, Graz-Cycle and Matiant-Cycle," PowerPoint presentation from the International Conference on Power Generation and Sustainable Development; Oct. 8-9,2001; Liege, Belgium; 18 pages.

Inoue, H. et al.; "Research and Development of Methane-Oxygen Combustor for Carbon Dioxide Recovery Closed-Cycle Gas Turbine"; CIMAC; 2001; Hamburg, Germany; pp. 876-882.

Benvenuti, E.; "Design and Test of a New Axial Compresssor for the Nuovo Pignone Heavy-Duty Gas Turbine," Journal of Engineering for Gas Turbines and Power; 1997; vol. 119; pp. 633-639.

Heitmeir, F. et al.; "The Graz Cycle — a Zero Emission Power Plant of Highest Efficiency"; XXXV Kraftwerkstechnisches Kolloquium; Sep. 23-24, 2003; Dresden, Germany (Graz University of Technology); 10 pages.

Jordal, K., "Modeling and Performance of Gas Turbine Cycles with Various Means of Blade Cooling"; 2001; Lund University, Sweden; ISBN 91/7894-135-1; 145 pages.

Kacker, S. C. et al.; "A Mean Line Prediction Method for Axial Flow Turbine Efficiency"; Journal of Engineering for Power; Jan. 1982; vol. 104; pp. 111-119.

Jordal, K et al.; "Aspects of Cooled Gas Turbine Modelling for the Semi-Closed O2/Co2 Cycle With Co2 Capture"; Proceedings of ASME TurboExpo 2003; Jun. 16-19, 200;, Atlanta, Georgia, USA; pp. 1-12.

Wei, N; "Significance of Loss Models in Aerothermodynamic Simulation for Axial Turbines"; PhD Thesis; 2000; Royal Institute of Technology, Sweden; ISBN 91/7170-540-6; 164 pages.

Ulfsnes, R.E. et al.; "Investigation of Physical Properties for CO2/H20 Mixtures for Use in Semi-Closed O2/CO2 Gas Turbine Cycle With CO2-Capture,"; Presented at ECOS 2003: 6th International Conference on Efficiency, Costs, Optimization, Simulation and Environmental Impact of Energy Systems; Jun. 30-Jul. 2, 2003; Copenhagen, Denmark; 9 pages.

Sanz, W. et al.; "A Further Step Towards a Graz Cycle Power Plant for CO2 Capture"; Proceedings of GT 2005, ASME Turbo Expo 2005: Power for Land, Sea and Air; Jun. 6-9, 2005; Reno-Tahoe, Nevada, USA; pp. 1-10.

Snarheim, D. et al.; "Control Design for a Gas Turbine Cycle With CO2 Capture Capabilities"; in IFAC World Congress; 2005; Prague; 6 pages.

Benvenuti, E. et al.; "Design and Development of the PGT 10 Heavy-Duty Advanced Gas Turbine"; Presented at the 1985 Beijing International Gas Turbine Symposium and Exposition; Sep. 1-7, 1985; Beijing, China; 10 pages.

Kurz, R.; "How 'Fuel-Flexible' Is Your Gas Turbine?"; Turbomachinery International; Sep./Oct. 2005; pp. 27-29.

Pucci, M. et al.; "Small Power Generation," GE Oil and Gas; 11 pages.

Carlsson, I.; "A Reduced-Order Through-Flow Program for Choked and Cooled Axial Turbines"; Thesis for the Degree of Master of Science; 2005; Division of Thermal Power Engineering, Department of Heat and Power Engineering, Lund Institute of Technology, Lund University, Sweden; 117 pages.

Johansson, E.M. et al.; "Catalytic Combustion for Gas Turbine Applications"; Catalysis; 1999; vol. 14; pp. 183-235.

Tap, F.; "Optimisation of the Main Air Flow in a Gas Turbine Combustion Chamber"; Summary report for project done by TU Delft for GE Nuovo Pignone (Italy); 1998; attp://www.renuda.cortilindex phi)?option=com_ content&task=view&id=89&Iternid=53& lang=en; 1 page.

Rokke, P.E. et al.; "Technology Update on Dual Fuel, Dry Low Emission Gas Turbine Combustion Systems"; PowerPoint presentation of ASME; 2003; GT-2003-38112; 20 pages.

Rokke, P.E. et al.; "Technology Update on Dual Fuel, Dry Low Emission Gas Turbine Combustion Systems"; Proceedings of ASME TURPO EXPO 2003; Jun. 16-19, 2003; Atlanta, Georgia, USA; ASME paper GT-2003-38112; pp. 1-11.

Cowell L.; "Combustion and Fuels," PowerPoint presentation, Solar Turbines Incorporated; http://www.epa.gov/CHP/pdf/presentations/forum_ wd/NCHPTTRECowellFinal.pdf; 33 pages.

Mina, T. et al.; "Combustion System Design for GAS_ZEP Cycle", PowerPoint presentation; Apr. 2005; ALSTOM Power; 33 pages.

Feraud, A.; "Novel Pre-Combustion and Oxy-Fuel Concepts"; ENCAP SP6 Presentation at the ENCAP -CASTOR Training Seminar; Mar. 16, 2006; Billund, Denmark; 26 pages.

Anonymous; "GE10 Gas Turbine," GE Energy web site info.; http://www.gepower.com/prod_serv/products/gas_turbines_ cc/en/sm_heavy_duty/ge10.htm; 1 pages.

Anonymous; "GE10 Gas Turbine,"GE Aero Energy Gas Turbine Brochure; 2006; http://www.gepower.com/prod_serv/products/gas_turbines_cc/en/downloads/ge10.pdf; 2 pages.

Hammons, T.J.; "Implementing Technology to Limit Climate Change"; IEEE Power Energy Society, Panel Session: Energy Development and Power Generation Committee; Jul. 18, 2000; Seattle, Washington, USA; 51 pages.

Quercioli, V. et al.; "A High Performance Retrofit for the GE10 Gas Turbine"; Pipeline & Gas Journal; Jun. 2004; 2 pages.

Anonymous; "Asset Enhancement Uprate Solutions for GE10"; GE Energy Oil & Gas Global Services brochure; 2005; 40 pages.

Jordal, K. et al.; "Precombustion Capture of CO2: Opportunities and Challenges"; presentation at European CO2 Capture and Storage Conference; Apr. 13-15, 2005; Brussels, Belgium; 25 pages.

Anonymous; 2nd EncapCO2 Newsletter; Feb. 2006; vol. 2; Web link: http://www.encapco2.org/publications/2nd_ENCAP_Newsletter.pdf; 4 pages.

Anonymous; 1st EncapCO2 Newsletter; Mar. 2005; vol. 1; Web link: http://www.eneapco2.org/publications/1st_ ENCAP_ Newsletter.pdf; 4 pages.

Chiesa, P. et al.; "CO2 Emissions Abatement in IGCC Power Plants by Semi Closed Cycles (Parts A and B)"; Journal of Engineering for Gas Turbines and Power; 1999; vol. 121, No. 4; pp. 635-648.

Dechamps, P.J. et al.; "The Use of CO2 in an Existing Industrial Gas Turbine"; 49th ATI National Congress; Sep. 26-30, 1994; Perugia; pp. 2309-2321.

Bolland, O.; "CO2 Capture", course notes for TEP9 course at NTNU; 2006; Trondheim, Norway; Web link: http://www.ept.ntnu.no/fag/tep9/innhold/CO2_tep9.pdf; 43 pages.

Shah, M.; "Capturing CO2 from Oxy-Fuel Combustion Flue Gas"; presentation at Oxy-Fuel Combustion Workshop; Nov. 29-30, 2005; Cottbus, Germany; Web link: http://www.co2captureandstorage.info/docs/oxyfule/w1/12W1Shah.pdf; 22 pages.

Palmer, C.A. et al.; "GateCycle Performance Analysis of the LM2500 Gas Turbine Utilizing Low Heating Value Fuels" presented at the IGTI/ASME Cogen Turbo Power '93 Conference; Proceedings of the IGTI ; Sep. 21-23, 1993; Bournemouth, England; vol. 8; pp. 69-76.

Palmer, C.A. et al.; "Simulation Methods Used to Analyze the Performance of the GE PG6541B Gas Turbine Utilizing Low Heating Value Fuels"; presented at the ASME/IGTI Cogen-Turbo Power '94 Conference; Proceedings of the IGTI; Oct. 25-27, 1994; Portland, Oregon, USA; pp. 337- 346.

Allam, R.J. et al.; "Oxyfuel Conversion of Refinery Process Equipment Utilising Flue Gas Recycle for CO2 Capture"; presented at the seventh IEA Greenhouse Gas Technologies Conference (GHGT-7); Sep. 5-9, 2004; Vancouver, Canada; 9 pages.

Mathieu, P. et al.; "Combination of Quasi-Zero Emission Power Cycles and CO2 Sequestration"; Fifth International Conference on Technologies and Combustion for a Clean Environment; Jul. 12- 15, 1999; Lisbon, Portugal; pp. 391-398.

Mcdonald, M.M. et al.; "A Design Study of the Application of CO2/02 Combustion to an Existing, 300 MW Coal Fired Power Plant"; Combustion Canada'99; May 25-28, 1999; Calgary, Canada; 13 pages.

Allaby, L. et al.; "Maximizing the Performance of Semi-Closed Oxygen/Carbon Dioxide Gas Turbine Combined Cycles for Power Generation"; M.A.Sc. (Aerospace) Thesis; 2006; Ottawa-Carleton Institute for Mechanical and Aerospace Engineering, Carleton University; Ottawa, Canada; 263 pages.

Zanganeh, K.E. et al.; "A Comparative Study of Refinery Fuel Gas Oxy-Fuel Combustion Options for CO2 Capture Using Simulated Process Data"; CANMET Energy Technology Centre; Presented at the 7th International Conference on Greenhouse Gas Control Technologies; 2004; Vancouver, Ottawa, Canada; 6 pages.

Cau, G. et al.; "Performance Assessment of Semi-Closed Chemically Recuperated Gas Turbine Systems"; ASME TURBO EXPO 2000; May 8 -11, 2000; Munich, Germany; Paper 2000-GT-161; 8 pages.

Andan, S. et al.; "Improving CHP Cycle with Once Through Steam Generators and Advanced Material Selection"; Innovative Steam Technologies; 2004; Cambridge, Ontario, Canada; 13 pages.

Zhang, N. et al.; "Proposal and Analysis of a Novel Zero CO2 Emission Cycle With Liquid Natural Gas Cryogenic Exergy Utilization "; Journal of Engineering for Gas Turbines and Power; Jan. 2006; vol. 128; pp. 81-91.

Zhang, N. et al.; "A Novel Near-Zero CO2 Emission Thermal Power System with LNG Cryogenic Exergy Utilization"; Powerpoint Presentation, presented at NTNU Global Watch; Aug. 29, 2003; 27 pages.

Smith, A.R. et al.; "A Review of Air Separation Technologies and Their Integration with Energy Conversion Processes"; Fuel Processing Technology ; 2001; vol. 70; pp. 115-134.

Allam R.J. et al.; "Air Separation Units, Design and Future Development"; presented at ECOS 2000, Gasification of Coal, Biomass and Oil, EUROTHERM Seminar No. 65; Jul. 5-7, 2000; University of Twente, Enschede, the Netherlands; 11 pages.

Shilling, N. Z. et al.; "IGCC — Clean Power Generation Alternative for Solid Fuels"; PowerGen Asia 2003; 9 pages.

Ball, R.W.; "Operating Gas Turbines on Low Calorific Value Gas"; presented at CIMAC, 14th International Congress on Combustion Engines; 1981; Helsinki, Finland; paper GT27; 19 pages.

Moore, M.J.; "NOx Emission Control in Gas Turbines for Combined Cycle Gas Turbine Plant"; Proc Instn Mech Engrs.; 1997; vol. 211 Part A; pp. 43-52.

Strub, R.A. et al.; "Influence of the Reynolds No. On the Performance of Centrifugal Compressors"; ASME Journal of Turbomachinery; 1987; vol. 109; pp. 541-544.

Kurz, R. et al.; "Site Performance Test Evaluation for Gas Turbine and Electric Motor Driven Compressors"; Proceedings of the Thirty-Fourth Turbomachinery Symposium; 2005; pp. 53-62.

Anonymous; "The New PGT5B, a Compact, State-of-the-Art 6 MW Gas Turbine for Power Generation Applications"; 2005; Website: http://www.gasnet.com.br/novidades/novidades_view2.asp?cod=410; 7 pages.

Gobbo, P. et al.; "Upgrading of V94.2K Combustion System"; Ansaldo Energia, presented at 2006 PowerGen Europe; 16 pages.

Kurzke J. "How to Create a Performance Model of a Gas Turbine from a Limited Amount of Information," Proceedings of GT 2005, ASME Turbo Expo 2005: Power for Land, Sea and Air, Jun. 6-9, 2005, Reno-Tahoe, Nevada, USA, ASME paper GT2005-68536, 9 pages.

Kurzke, J. et al.; "A New Compressor Map Scaling Procedure for Preliminary Conceptional Design of Gas Turbines"; Proceedings of the ASME IGTI TURBO EXPO 2000; May 8-11, 2000; Munich, Germany; ASME paper 2000-GT-0006; 7 pages.

Kurzke, J.; "Model Based Gas Turbine Parameter Corrections"; Proceedings of 2003 ASME Turbo Expo; Jun. 16-19, 2003; Atlanta, Georgia, USA; ASME Paper GT2003-38234; 9 pages.

Riegler, C. et al.; "Some Aspects of Modelling Compressor Behavior in Gas Turbine Performance Calculations"; Proceedings of the ASME IGTI Turbo Expo 2000; May 8-11, 2000, Munich, Germany; ASME paper 2000-GT-0574; 8 pages.

Kurzke, J.; "Performance Modeling Methodology: Efficiency Definitions for Cooled Single and Multistage Turbines"; Proceedings of 2002 ASME Turbo Expo; 3-6 Jun. 2002; Amsterdam, the Netherlands; ASME Paper 2002-Gt-30497; 8 pages.

Kurzke, J.; "Gas Turbine Cycles: Lab Exercise: Cycle Design for a Supersonic Turbojet Modeling the Siemens SGT-800" ;PowerPoint presentation; Jan. 18, 2006; 30 pages.

Young, J.B. et al.; "Modeling the Air-Cooled Gas Turbine. I. General Thermodynamics", Journal of Turbomachinery (Transactions of the ASME); Apr. 2002; vol. 124, No. 2; pp. 207-213.

Young, J.B. et al.; "Modeling the Air-Cooled Gas Turbine. II. Coolant Flows and Losses"; Journal of Turbomachinery (Transactions of the ASME); Apr. 2002; vol. 124, No. 2; pp. 214-221.

Carchedi, F. et al.; "Design and Development of a 12:1 Pressure Ratio Compressor for the Ruston 6-MW Gas Turbine"; Journal of Engineering for Power (Transactions of the ASME); Oct. 1982; vol. 104; pp. 823-831.

White, N.M. et al.; "Axial Compressor Performance Modeling with a Quasi-One-Dimensional Approach" ; Proceedings of the Institution of Mechanical Engineers A; Journal of Power and Energy,; 2002; vol. 216, No. A2; pp. 181-193.

Chiesa, P. et al.; "Using Hydrogen As Gas Turbine Fuel"; Journal of Engineering for Gas Turbines and Power; Jan. 2005; vol. 127, No. 3; pp. 73-80.

Chiesa, P. et al.; "A Thermodynamic Analysis of Different Options to Break 60% Electric Efficiency in Combined Cycle Power Plants"; Presented at 47th ASME International Gas Turbine & Aeroengine Congress and Exposition; 2002; Amsterdam, the Netherlands; Published in the Journal of Engineering for Gas Turbines and Power (Transactions of the ASME); Oct. 2004; vol. 126; pp. 770-785.

Hebbar, M.A. et al.; "Development of Turbo Machinery for a Zero CO2 Emissions Oxy-Fuel Cycle"; Presented at 2006 Pittsburgh Coal Conference; Sep. 25-28, 2006; Pittsburgh, Pennsylvania, USA; 13 pages.

Martinez-Frias, J. et al.; "Thermodynamic Analysis of Zero-Atmospheric Emissions Power Plant" Journal of Engineering for Gas Turbines and Power; Jan. 2004; vol. 126, No. 1; pp. 2-8.

Martinez-Frias, J. et al.; "A Coal-Fired Power Plant with Zero Atmospheric Emissions"; Proceedings of AES-IMECE: 2003 ASME International Mechanical Engineering Congress & Exposition; Nov. 15-21, 2003, Washington, D.C., USA; 16 pages.

Pronske, K. et al.; "An Overview of Turbine and Combustor Development for Coal-Based Oxy-Syngas Systems"; Proceedings of ASME Turbo Expo 2006; May 8-11, 2006; Barcelona, Spain; 12 pages.

Baxter, E. et al.; "Fabricate and Test an Advanced Non-Polluting Turbine Drive Gas Generator"; Final Report for DOE Project ; May 2003; DE-FC26-00NT 40804; 51 pages.

Imsland, L. et al.; "Control Issues in the Design of a Gas Turbine Capture Cycle for CO2 Capture"; International Journal of Green Energy; 2005; vol. 2; pp. 1-15.

Kurz, R.; "Gas Turbine Performance"; Proceedings of the Thirty-Fourth Turbomachinery Symposium; 2005; pp. 131-146.

Emmanuel, O. et al.; "Fundamental Impact of Firing Syngas in Gas Turbines"; Research Report; May 15-Aug. 4, 2006; University of Pittsburgh UTSR Fellowship Participant at Electric Power Research Institute (EPRI); 11 pages.

Carcasci, C. et al.; "Comparison of Blade Cooling Performance Using Alternative Fluids"; Presented at 47th ASME International Gas Turbine & Aeroengine Congress and Exposition; Jun. 3- 6, 2002; Amsterdam, the Netherlands; pp. 827-833.

Dillon, D.J. et al.; "Oxy-Combustion Processes for CO2 Capture From Advanced Supercritical PF and NGCC Plant"; 7th International Conf. On Greenhouse Gas Control Technologies; Sep. 2004; Vancouver, Canada; 9 pages.

Erbes, M.R. et al.; "Gate: A Simulation Code for Analysis of Gas-Turbine Power Plants"; IGTI/ASME Gas Turbine Congress; Jul. 1989; Toronto, Ontario, Canada; 19 pages.

Walsh, P.P. et al.; Gas Turbine Performance, Second Edition; Blackwell Science Ltd.; 2004; Oxford, United Kingdom; pp. 10-18, 61-65, 102-142, 143-158, 159-291, 292-382, 383-443, 444- 476, 564- 586, and 587-593.

* cited by examiner

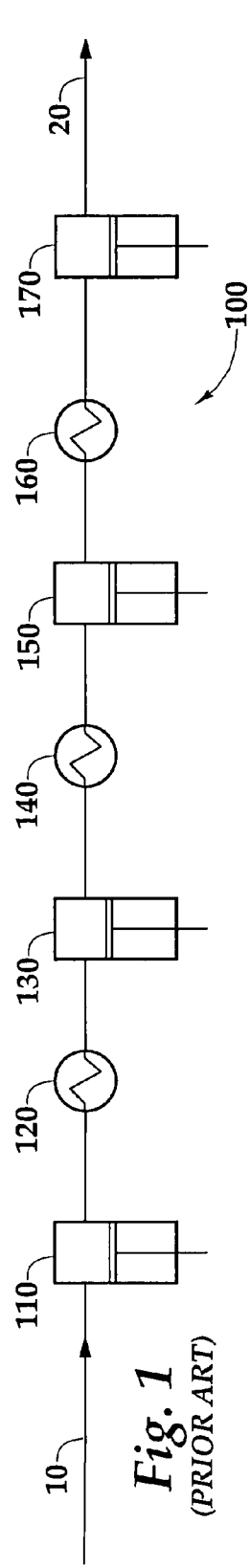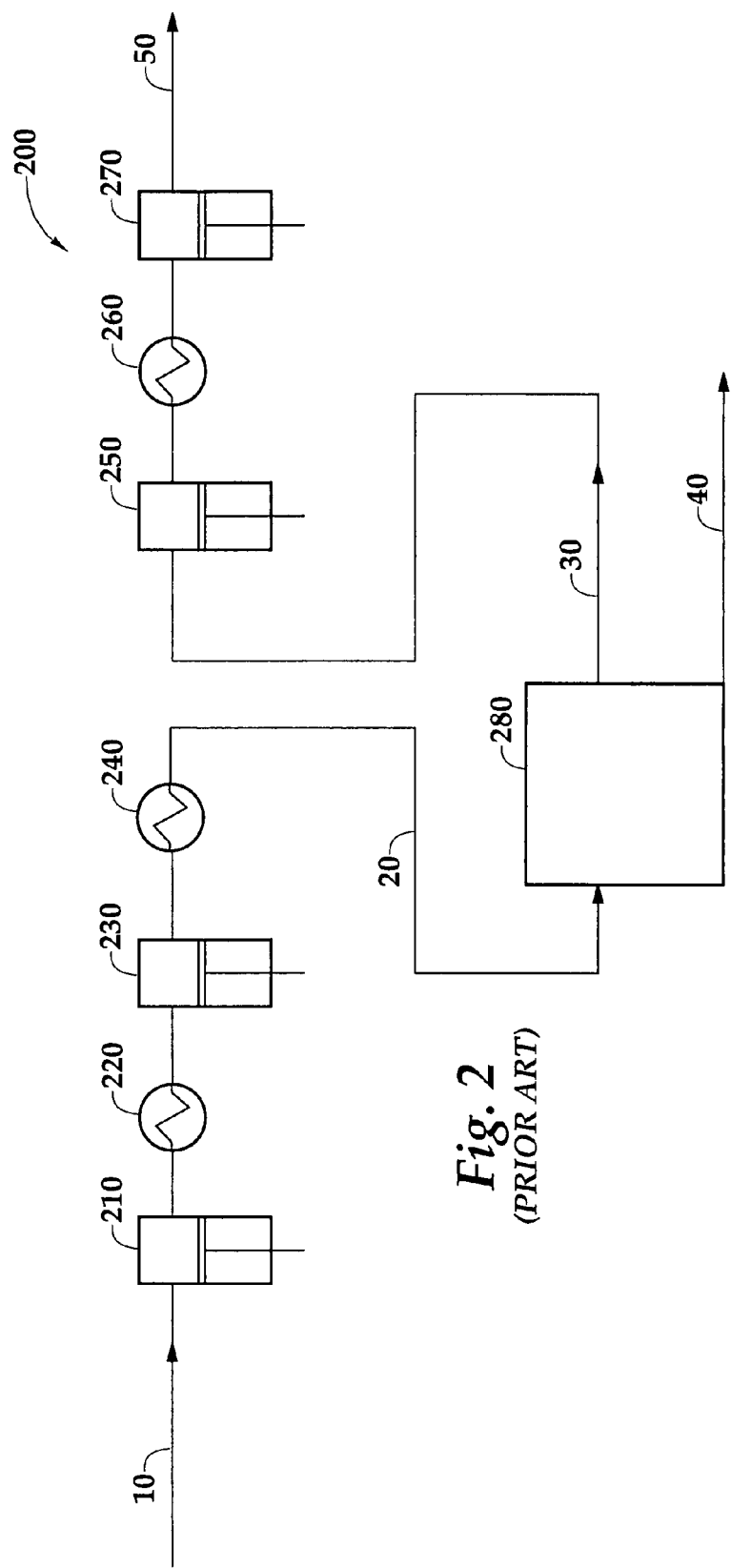
Fig. 1 (PRIOR ART)
Fig. 2 (PRIOR ART)

SYSTEM AND METHOD FOR PROCESSING A MIXTURE OF HYDROCARBON AND CO2 GAS PRODUCED FROM A HYDROCARBON RESERVOIR

CROSS-REFERENCE TO RELATED APPLICATION

This application claims the benefit of U.S. Provisional Patent Application No. 60/790,153, filed Apr. 7, 2006, which is incorporated by reference.

TECHNICAL FIELD

This invention relates to systems and methods used for enhanced oil recovery, and more particularly to a system and method for processing a mixture of hydrocarbon and carbon dioxide gas produced from a hydrocarbon reservoir.

BACKGROUND

Injection of carbon dioxide for tertiary enhanced recovery of oil from hydrocarbon reservoirs has been known and used worldwide since at least the 1980s. In particular, there are numerous carbon dioxide tertiary enhanced recovery projects in operation in the Permian Basin oil fields of west Texas. General literature about the conduct of such projects is well known and available from such sources as the Journal of Petroleum Technology and in papers published by the Society of Petroleum Engineers. Generally, in a carbon dioxide tertiary enhanced recovery project, the carbon dioxide is injected into a hydrocarbon reservoir via injection wells penetrating the producing formation. Oil, hydrocarbon gas, and water are produced through offsetting production wells.

Parrish, U.S. Pat. No. 4,344,486, incorporated by reference, teaches that the effectiveness of carbon dioxide as an aid to oil recovery is dependent on its miscibility pressure. As the carbon dioxide flows through a reservoir at an underground pressure above about 1,000 psi and a temperature of about 100 to 150° F., the carbon dioxide becomes partially miscible with the oil and helps push the oil toward the wellbore. The miscibility of the carbon dioxide with oil is dependent upon many factors including carbon dioxide purity, oil type, reservoir pressure, and reservoir temperature. The oil-carbon dioxide miscibility can be negatively affected by contaminants such as nitrogen, oxygen, oxides of nitrogen, carbon monoxide and methane. Parrish, U.S. Pat. No. 4,344,486, discloses that it is desirable for the carbon dioxide injection stream used in enhanced oil recovery to be substantially free from contaminants.

After carbon dioxide has been injected into the producing formation, the carbon dioxide will move through the producing formation driving a "flood front" of oil ahead of it toward the producing well. Ultimately, some of the carbon dioxide will reach the producing well and carbon dioxide will be produced in the production well together with the oil and hydrocarbon gases. The produced oil and gas mixture must be separated into its components.

At a primary field separation facility, oil is removed, treated, and sold. Free water, not entrained in the gas, is separated and disposed of or re-injected into the reservoir. The gaseous phase of the fluid stream is separated and sent from the primary field separation facilities to a central gas processing facility. In smaller fields, one gas processing facility may serve several fields. In a carbon dioxide enhanced recovery project, the produced gas will be a mixture of hydrocarbon gases and carbon dioxide. Additionally, some impurities such as hydrogen sulfide may also be present.

Combustion gas turbines capable of using low Btu gas as gas turbine fuel are well known in the art. Integrated gasification combined cycle (IGCC) systems have been used successfully to burn low caloric value (LCV) fuel. IGCC is a process in which a LCV fuel such as coal, petroleum coke, orimulsion, biomass or municipal waste may be converted to a low heating value synthetic fuel, which is used as the primary fuel in a gas turbine. Synthetic fuel has a heating value of about 125 Btu/scf to 350 Btu/scf. Typical natural gas has methane as its primary component and has a heating value of about 1,000 Btu/scf. The synthetic gas heating value and components may vary widely from one application to another and are highly dependent on the particular process producing the gas, the oxidant used, and the process feed stock. Further information on IGCC and flammability as a function of caloric value is discussed in a technical paper authored by R. D. Brdar and R. M. Jones, titled *GE IGCC Technology and Experience with Advanced Gas Turbines*, and is incorporated by reference.

Zapadinski, U.S. Patent Publication 2004/0154793 A1, incorporated by reference, discloses a method and system of developing a hydrocarbon reservoir wherein hydrocarbon gas from the field is combusted with air as an oxidant in a gas engine and the exhaust gas resulting from the combustion is compressed and then injected into the hydrocarbon reservoir. The exhaust gas of the system taught by Zapadinski includes a high percentage of nitrogen and nitrogen oxides in addition to carbon dioxide. The nitrogen comes from using air as the oxidant, since air contains about 79% nitrogen. At a given injection pressure, injection of carbon dioxide containing nitrogen or nitrogen oxides into a hydrocarbon reservoir is less efficient in the enhanced recovery process than use of pure carbon dioxide due to the negative effects of nitrogen on the miscibility of the injected gas with the oil in the reservoir. Kovarik F S, "A Minimum Miscibility Pressure Study Using Impure $CO_2$ and West Texas Oil Systems: Data Base, Correlations, and Compositional Simulation," Society of Petroleum Engineers Production Technology Symposium, November 1985, incorporated by reference.

In both an IGCC and a typical combined cycle system, the gas turbine compressor uses atmospheric air as the source of oxygen for combustion. In such a system, air is the working fluid in the system and the turbine exhaust gas is released to the atmosphere after heat capture in a heat exchanger or heat recovery steam generator. Alternatively, in a semi-closed combined cycle, the turbine exhaust gas is recirculated back to the inlet compressor. Although a semi-closed combined cycle using atmospheric air as the oxygen source will result in an exhaust gas and overall working fluid enriched in carbon dioxide, the working fluid will still contain a large nitrogen component, making the carbon dioxide containing slipstream much less than optimal composition for use in the enhanced recovery process. Finally, substantially pure oxygen may be used as the oxidant in a semi-closed combined cycle. By using substantially pure oxygen instead of air for combustion, the purity of the carbon dioxide in the exhaust gas stream and the overall working fluid is much higher. The literature contains many articles that discuss various aspects of the semi-closed combined cycle process and the change in working fluid from air to carbon dioxide, and its effect on the performance of the inlet compressor and gas turbine due to the difference in fluid properties. Roberts S K, Sjolander S A, 2002, "Semi-Closed Cycle O2/CO2 Combustion Gas Turbines: Influence of Fluid Properties on the Aerodynamic Performance of the Turbomachinery." ASME GT-2002-30410.

Proceedings of ASME TURBO EXPO 2002, Amsterdam, The Netherlands, Jun. 3-6, 2002, incorporated by reference. According to Roberts and Sjolander, two fluid properties that should be considered when switching from air to a carbon dioxide working fluid include the ratio of specific heats ($\gamma$) and the gas specific constant (R). At any given temperature, the carbon dioxide working fluid has a lower ratio of specific heats, lower gas specific constant, and higher density as compared to the air working fluid. The ratio of specific heats for carbon dioxide is approximately 1.28 at 300 K, the ratio for air is approximately 1.40 at 300 K and the ratio for water vapor (a product of combustion) is 1.14 at 300 K. Similarly, the gas specific constant differs significantly between carbon dioxide (188.9 J/kg-K), air (288.2 J/kg-K) and water vapor (461.5 J/kg-K).

Another journal article describes how the ratio of specific heats ($\gamma$) and the gas specific constant (R) are used to calculate the turbo machinery non-dimensional mass flow ($\pi_M$) and non-dimensional speed ($\pi_N$) parameters, which also need to be considered when changing the working fluid from air to carbon dioxide. Jackson A J B, Neto A C, Whellens, M W. 2000. "Gas Turbine Performance Using Carbon Dioxide as Working Fluid in Closed Cycle Operation." ASME 2000-GT-153. ASME TURBOEXPO 2000, Munich, Germany, May 8-11, 2000, incorporated by reference. The large difference between the ratio of specific heats ($\gamma$) and gas specific constant (R) for carbon dioxide and air affects the turbo machinery non-dimensional mass flow and non-dimensional speed parameters and this presents a challenge for using existing turbo machinery equipment for a carbon dioxide working fluid.

SUMMARY

The present disclosure comprises a system and method for purification and re-injection of the carbon dioxide component of a produced hydrocarbon gas/carbon dioxide mixture. Instead of separating the hydrocarbon component from the hydrocarbon/carbon dioxide produced gas mixture (as is typically done in prior art systems), in the present invention, the produced gas mixture of hydrocarbon and carbon dioxide is used as a low Btu fuel gas for one or more gas fired turbines that are used to produce rotary energy used to drive electric generators and compressors. Low Btu fuel gas is defined here as a fuel gas with a heating value less than pipeline quality fuel gas, ranging as low as 100 Btu/scf heating value. The electricity produced by the electric generators may be sold and/or used in oil field and processing plant operations to enhance the economics of the project.

In the present invention, the exhaust gas from the turbine is captured, cooled, compressed, and re-injected into the producing formation via the injection wells. The captured exhaust gas consists of the original carbon dioxide component of the produced gas that was used as fuel gas and additional carbon dioxide formed by the combustion of the hydrocarbon component of the fuel gas in the turbine. To minimize dilution of the carbon dioxide stream, substantially pure oxygen is used as an oxidant and it is mixed with the fuel gas in the combustion process.

The system for treating the mixture of hydrocarbon and carbon dioxide gas produced from a hydrocarbon reservoir includes a gas power turbine adapted to burn the produced gas mixture of hydrocarbon gas and carbon dioxide as fuel gas with oxygen as an oxidizing agent. A capture system collects the exhaust gas from the power turbine. The exhaust gas includes a carbon dioxide component from the fuel gas and carbon dioxide formed as a product of the combustion of the oxygen and hydrocarbon component of the fuel gas. An electric generator is driven by the power turbine and an inlet compressor is driven by the power turbine. The inlet compressor receives cooled exhaust gas from the capture system and compresses the exhaust gas for further recompression and injection of the exhaust gas into a hydrocarbon reservoir.

The system may include a heat recovery steam generator adapted to receive heat from the captured exhaust gas and convert said heat to steam. A steam turbine is driven by steam from the heat recovery generator, and an electric generator is driven by the steam turbine. In another embodiment of the system, steam produced in the heat recovery steam generator may be re-injected into the power turbine in order to increase the energy output of the power turbine, while at the same time eliminating the need for a separate steam turbine installation. Another embodiment of the system may include a recuperator wherein high-pressure air or nitrogen is cross-exchanged with the hot exhaust gas from the power turbine to recover the exhaust gas heat. After cross exchange, the heated high-pressure air or nitrogen can be let down through a turbo expander which is then used to drive an electric generator. The system may further include a membrane system upstream of the inlet to the power turbine, wherein the membrane preferentially removes carbon dioxide from the produced gas stream before the stream is used for fuel gas in the power turbine. The carbon dioxide and hydrogen sulfide removed by the membrane system is combined with the exhaust gas for injection of the combination into a hydrocarbon reservoir.

A method for conducting a carbon dioxide enhanced recovery process using the above equipment is also disclosed. The method includes providing produced gas from a hydrocarbon reservoir wherein the produced gas contains a hydrocarbon gas component and at least 50 mol % of a carbon dioxide component; providing substantially pure oxygen of at least 90 mol %; combusting the produced gas as fuel with a slight stoichiometric excess of oxygen to achieve substantially complete combustion; sending the combustion products to a power turbine; collecting the exhaust gas from the power turbine; removing heat and water from the collected exhaust gas; compressing the collected exhaust gas; and providing the compressed exhaust gas for injection into a hydrocarbon reservoir.

The method may also include driving an electric generator with the power turbine and driving a compressor with the power turbine. Alternatively, one or more compressors may be driven with electricity generated by one of the system's generators or from a power grid into which the generated electricity is fed.

The method may also include removing heat from the collected exhaust gas and using said heat to create steam; driving a steam turbine with said steam; and driving an electric generator with said steam turbine.

The method may also include removing heat from the collected exhaust gas and using said heat to create steam; then injecting such steam into the power turbine in order to increase the power output of the power turbine and eliminate the need for a separate steam turbine.

The method may also include removing heat from the collected exhaust gas in an exchanger and using air or nitrogen heated in the exchanger to drive a turbo expander, which is used to drive an electric generator.

The method may also include processing the produced gas through a membrane system to remove a portion of the carbon dioxide component and mixing the removed carbon dioxide with the compressed collected exhaust gas for reinjection into the reservoir.

The project may include further compressing the compressed gas using one or more stages of additional compression and driving the additional stages of compression with electricity produced by the system.

The project may include powering an air separation plant, which provides the oxygen for combustion of the fuel gas, with electric power from one or more of the system generators.

Among other advantages, the present invention allows carbon dioxide tertiary recovery projects to be implemented in smaller hydrocarbon fields where the initial investment and operating expenses of conventional prior art carbon dioxide/hydrocarbon processing plants are not economically justified. The present invention provides a source of carbon dioxide from the combustion of fuel in the power turbine for use in carbon dioxide tertiary recovery projects where there is no other economically viable source of carbon dioxide.

The present invention reduces air pollution by capturing the exhaust gases from the power turbine. The captive pollutants include nitrogen oxides and sulfur oxides. Additionally, capture and injection of the carbon dioxide combustion product prevents the carbon dioxide from being discharged into the atmosphere and reduces carbon dioxide that contributes to the "greenhouse" effect.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 1 is a schematic of a prior art system and method for processing of a produced gas mixture of carbon dioxide and hydrocarbon gas without the removal of the hydrocarbon component;

FIG. 2 is a schematic of a prior art system and method for processing of a produced gas mixture of carbon dioxide and hydrocarbon gas with removal of the hydrocarbon component;

Like reference symbols in the various drawings indicate like elements.

DESCRIPTION OF PRIOR ART FIGURES

Figure 3:
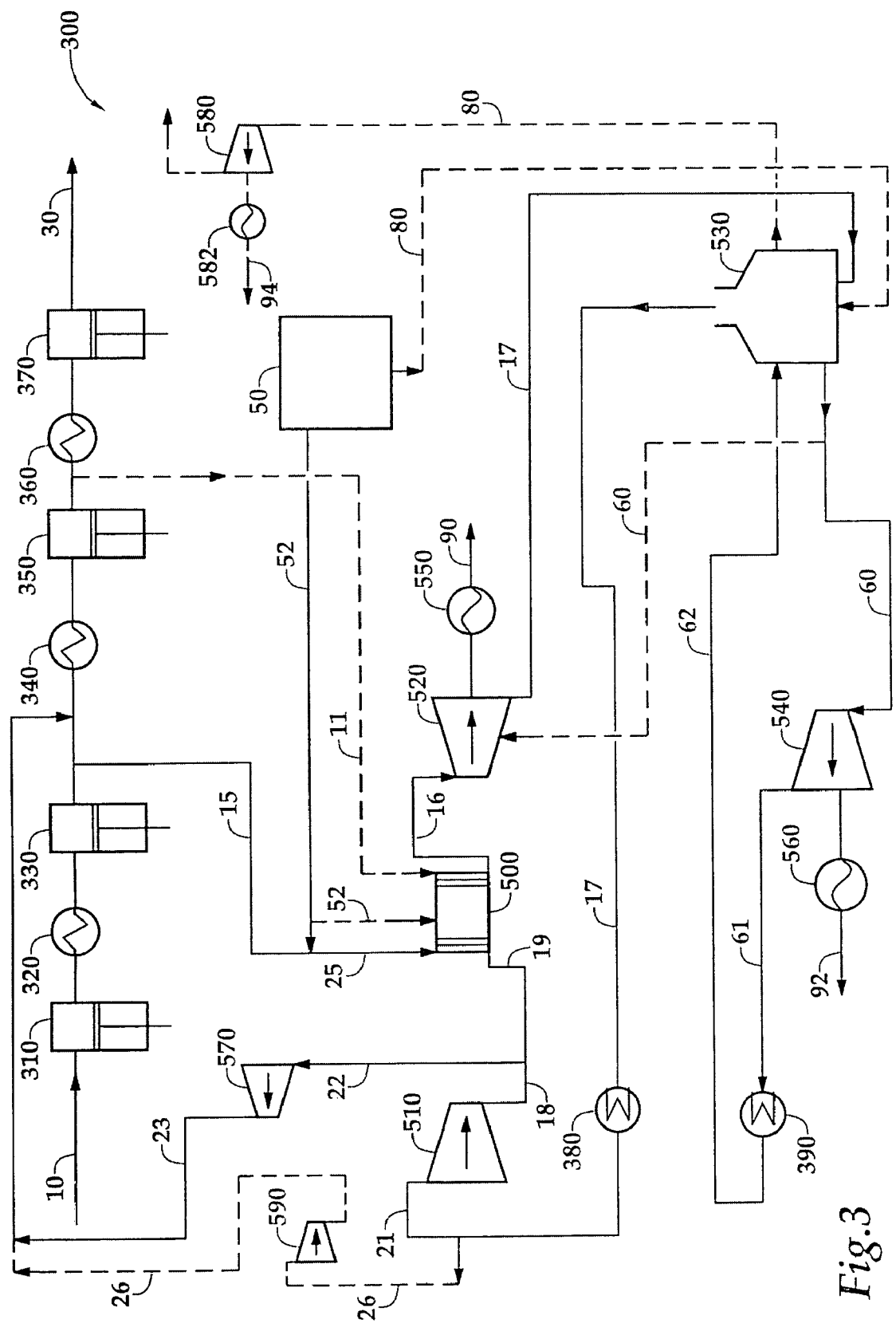
FIG. 3 is a schematic of a system and method of an embodiment of the present invention for processing of a produced gas mixture of carbon dioxide and hydrocarbon gas and re-injection of the carbon dioxide component into a hydrocarbon reservoir.

Referring now to FIG. 1, in one prior art scenario, a gaseous mixture 10 of carbon dioxide/hydrocarbon gas from the field is received in a gas processing facility 100 subsequent to the initial field separation from the oil and the water (not shown). The gas 10 is sent through several stages of compression 110, 130, 150 and 170 with inter-stage cooling 120, 140 and 160. The pressurized carbon dioxide/hydrocarbon mixture 20 is then returned to the field for re-injection into an injection well.

Referring now to FIG. 2, in another prior art scenario, a gaseous mixture 10 carbon dioxide/hydrocarbon gas from the field is received in a gas processing facility 200 subsequent to the initial field separation from the oil and the water (not shown). The gas 10 is sent through several stages of compression 210, 230, 250 and 270 with inter-stage cooling 220, 240 and 260.

Between the second and third stages of compression, the gas 20 is sent to a carbon dioxide/hydrocarbon removal unit 280. Carbon dioxide 30 is removed from the gas 20 and the hydrocarbon gases 40 are sold. The hydrocarbon gas being sold may be further broken down into components and sold as methane, ethane, propane, butane, and heavier natural gas liquids. The pressurized carbon dioxide 50 is then returned to the field for re-injection into an injection well. While this separation of carbon dioxide from the hydrocarbon is illustrated simplistically as block 280 in FIG. 2, the process is complicated and requires a plant that has high initial construction costs and significant operating costs.

DETAILED DESCRIPTION

Referring to the attached FIG. 3, therein is illustrated a system 300 for processing and re-injection of the carbon dioxide component 30 of a hydrocarbon gas/carbon dioxide mixture 10 produced from a hydrocarbon reservoir. Instead of processing the hydrocarbon/carbon dioxide produced gas mixture 10 to separate the carbon dioxide and hydrocarbon (as illustrated in prior art FIG. 2), the produced gas mixture 10 of hydrocarbon and carbon dioxide is used as a low Btu fuel gas 15 for the burners 500 of one or more gas fired power turbines 520 that are used to drive one or more electric generators 550. The gas turbine may drive the generator directly via a coaxial shaft or through a gearbox. The electricity 90 is sold and/or used in oil field and processing plant operations to enhance the economics of the project.

The produced gas mixture 10 of carbon dioxide/hydrocarbon is generally received from the hydrocarbon field at 35 psia or less. The gas is compressed in one or more stages from about 35 psia to about 300 psia via first stage compressor 310 and second stage compressor 330. The gas is cooled by intercooler 320. The produced gas mixture 10 of hydrocarbon and carbon dioxide is used as a low Btu fuel gas 15 for the burners 500 of one or more gas fired power turbines 520 that are used to drive one or more electric generators 550. All or part of the produced gas mixture It) may be used as fuel gas 15 for the burners 500. After combustion of fuel gas 15 in burners 500, combustion gas 16 passes through power turbine 520 and is collected as exhaust gas 17. The exhaust gas 17 (comprised of carbon dioxide, water, and any residual oxygen from the power turbine 520) is collected at approximately atmospheric pressure, cooled in a heat exchanger or heat recovery steam generator 530, further cooled and excess water vapor removed in condenser 380 and recompressed in inlet compressor 510 to about 250 psia. Compressed gas 18 exits from the high-pressure side of inlet compressor 510. Substantially pure oxygen 52 from an oxygen plant 50 may be mixed with the fuel gas 15 to create a combustion mixture 25 for burner 500. Substantially pure oxygen is defined as having 90 mol % or greater oxygen concentration. Alternatively, some burner arrangements are designed with the oxygen stream 52 injected directly into the burner 500 instead of. or in addition to, being mixed with the fuel gas 15 before the burner 500.

Air separation plants suitable for producing substantially pure oxygen are well known in the art and are available from a number of vendors including Praxair and Air Products and Chemical. Such plants may use either cryogenic systems, vacuum pressure swing adsorption systems and other existing or future technology capable of producing substantially pure oxygen that contains less than 10% contaminants. In addition to these proven oxygen production technologies, there are new, emerging technologies such as the Ion Transport Membrane process (ITM) that also produce substantially pure oxygen and these processes would also be suitable for the present invention.

Referring also to FIG. 3, in an alternative embodiment of the system 300, the produced gas mixture 10 is further compressed to approximately 700 psia (as opposed to 300 psia) via third stage compressors 350 before being combusted in the burners 500. In this alternative embodiment, carbon dioxide return streams 23 would necessarily be returned at the inlet of intercooler 360 instead of at the inlet of intercooler 340. Operating the system by supplying higher starting pressure gas stream 11 to burners 500 would improve the thermodynamic efficiency of the overall cycle. The number of stages of compression (310, 330, 350, and 370) and stage pressures may vary in each installation of the system, but the concept of removing carbon dioxide/hydrocarbon fuel from one point and returning carbon dioxide to a downstream point remains the same.

In the system 300, the carbon dioxide gas stream 17 from the heat exchanger 530 is further cooled in condenser 380 before being supplied as working fluid to the inlet compressor 510. The additional cooling in condenser 380 can be used as a method not only to control the temperature, but also to control the water vapor content in the carbon dioxide gas stream, thus affecting the working fluid properties and providing additional control of the inlet compressor 510 and power turbine 520. A portion 22 of the carbon dioxide gas stream 18 is drawn off from the outlet of inlet compressor 510 and sent to re-compressor 570 . A portion 19 of the carbon dioxide gas stream 18 is drawn off for use as working fluid 19 in burner 500 of the power turbine 520. The carbon dioxide gas stream 23 from re-compressor 570 is then sent to compressors 350 and 370 and inter-stage coolers 340 and 360 for reinjection in the field. As illustrated in FIG. 3, in one embodiment of the invention, a portion 26 of the low pressure carbon dioxide gas stream 21 can be re-compressed in compressor 590 and sent to compressors 350 and 370 and intercoolers 340 and 360, bypassing inlet compressor 510. The compressed carbon dioxide stream 30 is returned to the field to be re-injected at about 2000 psi into the producing formation via the injection wells.

The captured exhaust gas 17 primarily comprises the original carbon dioxide component of the produced hydrocarbon/carbon dioxide gas 10 that was used as fuel gas 15, and additional carbon dioxide formed by the combustion of the hydrocarbon component of the fuel gas in the burner 500. To minimize dilution of the carbon dioxide stream for reinjection, substantially pure oxygen is mixed with the fuel gas in the combustion process. This minimizes the introduction of nitrogen into the combustion gas. If atmospheric air is used for combustion (instead of the substantially pure oxygen 52), the nitrogen will dilute the composite carbon dioxide gas stream being returned to the hydrocarbon reservoir for reinjection. As discussed in the background section of this application, the dilution of the carbon dioxide affects miscibility of the gas with the oil in the reservoir and therefore has unfavorable effects on the tertiary recovery process in the hydrocarbon reservoir.

The system 300 may include a matched set comprising an inlet compressor, combustor, and power turbine designed and manufactured by one company. It will be understood that various modifications may be made to the equipment design without departing from the spirit and scope of the invention. One such modification is to select individual manufacturers for the inlet compressor, combustor, and power turbine based on optimal equipment design. Another such set of alterations may include a change of the material of construction of the power turbine blades, modification of the power turbine cooling flow, and modification of controls for the inlet compressor, combustor, or power turbine.

Heat exchanger 530 may use excess heat from the power turbine exhaust gas 17 to form steam 60 that is used to drive steam turbine 540 and generator 560 to generate electricity 92. Spent steam 61 from turbine 540 is cooled in condenser 390 and condensed to water 62. The condensed water is then returned to heat exchanger 530 for creation of more steam 60. In one embodiment a "once through steam generator" system formed of Inconel material may be used for the heat exchanger 530. In another embodiment, the steam 60 may be injected into the power turbine 520 in order to increase the output power of the power turbine and possibly eliminate the need for a separate steam turbine 540. In another embodiment, heat exchanger 530 is alternatively used to heat a high-pressure gas 80 consisting of air or nitrogen from air separation plant 50. This high-pressure gas 80 may be used as power gas in a turbo expander engine 580. The power gas 80 may be let down in pressure through a turbo expander 580 to drive a generator 582 and produce additional power 94.

Figure 4:
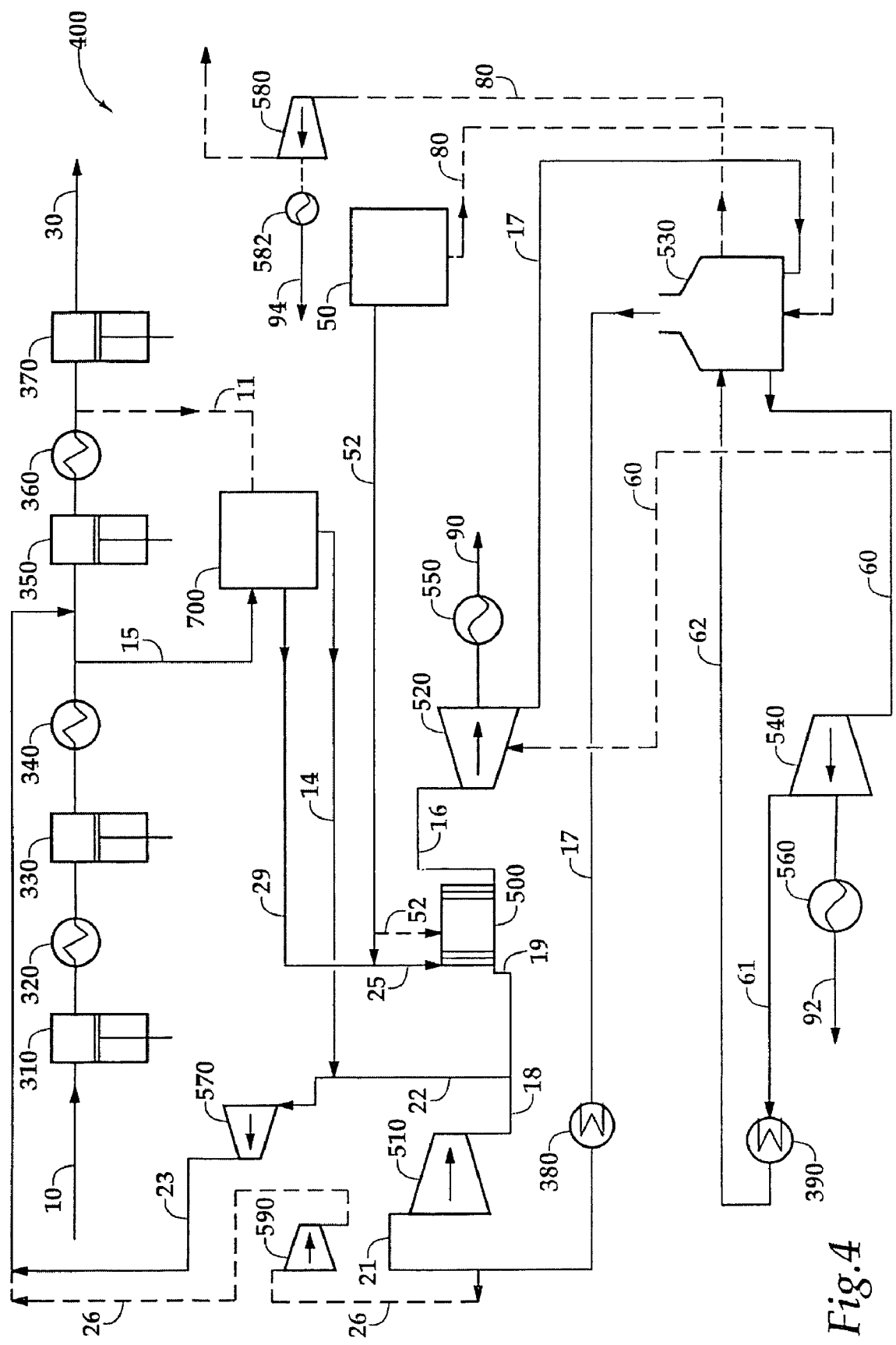
FIG. 4 is a schematic of a system and method for processing of a produced gas mixture of carbon dioxide and hydrocarbon gas wherein the present invention further includes a membrane carbon dioxide removal system and re-injection of the carbon dioxide component into a hydrocarbon reservoir.

Referring now to FIG. 4, therein is disclosed the system and method 400. FIG. 4 includes a membrane separation system 700 used to separate a portion of the carbon dioxide contained in the low Btu fuel gas 15. As the tertiary enhanced recovery project matures and more carbon dioxide has been injected into the reservoir, the mixture of carbon dioxide and hydrocarbon gas produced from the reservoir will increase in carbon dioxide content. A membrane separation system 700 may be installed to remove some of the carbon dioxide and other components of the fuel gas 15 including any hydrogen sulfide contained in the fuel gas 15. Blizzard, Parro, and Homback discuss commercially available membrane technology in the article *Mallet Gas Processing Facility Uses Membranes to Efficiently Separate $CO_2$*, Blizzard G, Parro D, Homback K, Oil and Gas Journal, Apr. 11, 2005, incorporated by reference.

The removed carbon dioxide may be recycled as a carbon dioxide stream 14 to a lower pressure point in the system, such as the inlet of re-compressor 570 or the inlet of a separate recompressor (not shown). Removal of the carbon dioxide via the membrane system 700 has several advantages. First, partial removal of carbon dioxide from the fuel gas 15 reduces the total volume of gas 29 being sent to the fuel gas system, which can reduce the size and cost of certain fuel handling and combustion equipment. Second, by removing some of the carbon dioxide, the caloric value of the fuel gas 29 for the power turbine can be raised to a more typical range of 300 to 500 Btu/scf and the technology of the turbines may be more conventional. Third, hydrogen sulfide contaminants in the fuel gas 15 will be preferentially removed by the membrane, thereby significantly reducing any need for the equipment described in this invention to be constructed of expensive corrosion resistant materials when the produced gas 10 contains significant amounts of hydrogen sulfide contaminants. It should be noted that withdrawal of the fuel gas 15 from the produced gas 10 in this method 400 would occur downstream of intercooler 340 rather than upstream of intercooler 340 as in method 300 since membranes generally require lower inlet temperatures to operate properly. The carbon dioxide return stream 23 would therefore need to be cooled separately (not shown) before being returned to a downstream point.

The remaining system elements of FIG. 4 are substantially the same as elements that were previously discussed with regard to FIG. 3 and have been assigned the same reference numerals.

The produced carbon dioxide/hydrocarbon gas 10 is a low Btu gas that has many of the same properties of synthetic gas. Gas turbines developed for synthetic low heating value fuel gas are capable of use in the present invention. Table 1 lists a range of IGCC turbines manufactured by GE that may be suitable for use with the present invention. Information on these turbines is available at GEPower.com, the disclosure of which is incorporated by reference into this application. The invention is not limited to the use of only these specified gas turbine models.

TABLE 1

| GE Gas Turbine Model | Syngas Power Rating |
|---|---|
| GE10 | 10 MW (50/60 Hz) |
| 6B | 40 MW (50/60 Hz) |
| 7EA | 90 MW (60 Hz) |
| 9E | 150 MW (50 Hz) |
| 6FA | 90 MW (50/60 Hz) |
| 7FA | 197 MW (60 Hz) |
| 9FA | 286 MW (50 Hz) |

Because IGCC synthetic gas has a low heating value compared to natural gas, significantly more fuel must be injected in an IGCC turbine as compared to a standard gas turbine. The mass flow input is larger with an IGCC turbine and for this reason, the gas turbine has enhanced power output. Enhanced power output is also obtained when the low Btu produced gas 10 is used as fuel gas.

Table 2 illustrates three different cases with molecular compositions of produced gas 10. The heating values range from approximately 120 Btu/scf to 420 Btu/scf. Case I is the upper end of the Btu range for produced gas 10. Case II is the lower end of the Btu range for produced gas 10. The gas conditions listed in Case I and Case II are typical of the process illustrated in FIG. 3. Case III is typical of produced gas downstream 29 of a membrane separation system 700 as illustrated in FIG. 4.

TABLE 2

|  | Case I (Mol %) | Case II (Mol %) | Case III (Mol %) |
|---|---|---|---|
| Nitrogen | 2.75 | 1.90 | 1.35 |
| Carbon Dioxide | 80.00 | 90.70 | 79.00 |
| Hydrogen Sulfide | 1.65 | 1.50 | 0.10 |
| Oxygen | -0- | -0- | -0- |
| Methane | 8.50 | 3.00 | 6.50 |
| Ethane | 1.50 | 0.55 | 3.50 |
| Propane | 2.40 | 1.00 | 4.30 |
| Iso-Butane | 0.60 | 0.25 | 1.10 |
| Normal-Butane | 1.30 | 0.60 | 2.55 |
| ISO-Pentane | 0.45 | 0.20 | 0.65 |
| Normal-Pentane | 0.35 | 0.15 | 0.50 |
| Hexanes | 0.40 | 0.10 | 0.25 |
| Heptanes+ | 0.10 | 0.05 | 0.20 |
|  | 100.00 | 100.00 | 100.00 |
| Heating value (Btu/CF HHV) | ~320 | ~120 | ~420 |

As the tertiary carbon dioxide enhanced recovery project progresses, additional wells are placed on carbon dioxide injection and some injection wells are removed from carbon dioxide injection. Therefore, the carbon dioxide content in the produced gas will vary throughout the life of the project since it is a mixture of carbon dioxide gas from wells in various stages of their productive life. The above case examples in Table 2 are merely for illustrative purposes for produced gas from a typical Permian basin oil field in West Texas. Produced gas from other oil fields and from other areas will have different molar compositions. The present invention is not limited to the example compositions of produced gas or Permian basin produced gas. It will be understood that the system and method of the present invention may be used to process produced gas from one or more different hydrocarbon reservoirs and the carbon dioxide available for re-injection may be injected into one or more of the same or different reservoirs from which the gas was produced.

In addition to the economic advantages of the present invention that have been previously discussed, another advantage of the present invention is its unique control scheme. Several industry trade journal articles mentioned in the background section of this application note some of the differences between air and carbon dioxide working fluid and how existing power turbines and compressors designed for air service may work in carbon dioxide fluid service. These journal articles also discuss the difficulty and complexity of using standard turbo machinery equipment with carbon dioxide as the working fluid. The present invention includes a control method that enables the use of standard turbo machinery equipment. Use of standard turbo machinery as opposed to customized special order machinery can favorably affect the economics of the project via lower initial cost and lower replacement and operating costs.

As was briefly discussed earlier in the background section, the ratio of specific heats ($\gamma$) and the gas specific constant (R) are used to determine the non-dimensional mass flow ($\pi_M$) and non-dimensional speed ($\pi_N$) parameters of the turbo machinery. The present invention contains several process parameters that can be adjusted independently or simultaneously to obtain non-dimensional parameters for the carbon dioxide working fluid that sufficiently approximate the parameters for an air working fluid. The composition, pressure and temperature of the carbon dioxide stream feeding the inlet compressor 510, the rotational speed of the inlet compressor 510, and the rotational speed of the power turbine 520 are some of the adjustable parameters.

In the system 300 of FIG. 3, the condensing pressure and temperature of condenser 380 may be used to control the composition of the carbon dioxide exhaust gas that is fed to the inlet compressor 510. A significant constituent in the carbon dioxide exhaust gas is water vapor, which is a product of combustion. At a higher condensing temperature, less water vapor will be condensed out of the carbon dioxide exhaust gas and more water vapor will remain in the carbon dioxide exhaust gas. For example, exhaust gas condensed at approximately 165° F. will contain approximately six times the water vapor content as exhaust gas that has been condensed at about 120° F. and approximately fifteen times the water vapor content as exhaust gas that has been condensed at 90° F. Due to the varied fluid properties of air, carbon dioxide, and water vapor, varying the exhaust gas composition by means of adjusting the condensing pressure and temperature will cause the weighted average of the ratio of specific heats ($\gamma$) and the gas specific constant (R) of the exhaust gas mixture to be significantly different, which will cause the non-dimensional mass flow and non-dimensional speed parameters to vary accordingly. Therefore, variation of the condensing pressure and temperature will allow control of the non-dimensional mass flow and non-dimensional speed parameters. This mechanism can be used as one way of controlling the overall equipment performance, but in addition, if the turbo machinery non-dimensional parameters with the carbon dioxide working fluid are made to sufficiently approximate the turbo machinery non-dimensional parameters with the air working fluid, then control of both the inlet compressor 510 and the power turbine 520 can be achieved, either independently or in combination with the other control parameters. Ultimately, changing the condensing pressure and temperature of the carbon dioxide gas can provide control of the cycle of the present invention.

The rotational speeds of the inlet compressor 510 and power turbine 520 can also be changed to affect the turbo machinery non-dimensional speed parameters. By reducing the rotational speed of the inlet compressor 510 or the power turbine 520, the carbon dioxide working fluid mass flow is reduced and the turbo machinery non-dimensional mass flow parameters become more similar to the non-dimensional mass flow parameters for the turbo machinery with air as the working fluid. Additionally, steam injection into the power turbine, either at the turbine inlet or between turbine stages, may be used as a control method. The steam injection into the power turbine will further adjust the temperature and composition of the carbon dioxide working fluid, and will therefore change the non-dimensional parameters of the power turbine. Performed separately or in combination, modifying the inlet compressor 510 feed gas pressure, temperature and water vapor content, the inlet compressor 510 rotational speed, and the power turbine 520 pressure, temperature and water vapor content as well as the power turbine 520 rotational speed can be made to cause the turbo machinery non-dimensional speed parameters to sufficiently approximate the non-dimensional speed parameters of turbo machinery used in a conventional air cycle.

The unique control scheme of the present invention presented thus far can be used during normal, steady-state operations and for fine-tuning during transient operations. Additional control methods are also necessary to provide proper control during transient conditions. If not properly controlled, the use of carbon dioxide as the working fluid can result in rotating stall of the power turbine compressor due to the high density and other different fluid properties of carbon dioxide as compared to air. The amount of flow through the inlet compressor 510 can be controlled during startup, surge, or stall conditions by varying the amount of low-pressure carbon dioxide 26 that is taken off upstream of the inlet compressor 510 and sent to compressor 590 before being sent to compressors 350 and 370 and intercoolers 340 and 360.

It should be noted that if the turbo machinery non-dimensional parameters of the present invention are similar to the non-dimensional parameters for turbo machinery used in an air cycle, it may be possible to use standard turbo machinery equipment or make relatively minor adaptations to standard turbo machinery equipment for use with the carbon dioxide working fluid at significant cost savings. In addition, control of the inlet compressor feed gas via the control scheme of the present invention is superior to prior art systems that recycle steam to adjust the fluid properties, as taught by Stahl, U.S. Pat. No. 4,434,613, incorporated by reference.

Because of the continuous operation of the tertiary enhanced oil recovery process, the produced gas 10 in the present invention is always available. Therefore, startup of the semi-closed combined cycle system 300 or 400 of the present invention can be performed using the carbon dioxide/hydrocarbon fuel source 15 or 29 and oxygen 52 instead of using a natural gas fuel source and air as the oxidant. This is a unique feature of the present invention. In prior art systems discussed in the literature, the fuel gas is often pipeline natural gas and the carbon dioxide stream is not available when the plant is ready to startup. In general, the prior art literature suggests that startup of a similar semi-closed combined cycle should be done using air and natural gas fuel in an open cycle arrangement until enough carbon dioxide is produced to enable the cycle to operate as a semi-closed cycle. Ulizar I, Pilidis P. 2000, "Handling of a Semi-Closed Cycle Gas Turbine with a Carbon Dioxide-Argon Working Fluid." Journal of Engineering for Gas Turbines and Power, 122(3), pp. 437-441. The present system 300, 400 will not require operation as an open cycle during startup and this minimizes the complexity of the control design.

Another advantage of the present system 300, 400 is that no air pollution removal equipment is required in the systems illustrated in FIG. 3 and FIG. 4. Any pollution (nitrogen oxides and sulfur oxides) generated by the combustion of fuel gas in the power turbine is gathered and injected with the carbon dioxide into the hydrocarbon reservoir. The system 300, 400 and method of the present invention produces electricity without adding nitrogen oxides, sulfur oxides and carbon dioxide to the environment. Reduction of carbon dioxide emissions in the course of producing electricity is considered beneficial in order to reduce "greenhouse" gas effects. Greenhouse gas allowances and greenhouse avoidance tax credits may be of significant economic benefit and further improve system 300 and 400 economics.

At least one of the differences between the present invention and the disclosure of Zapadinski, U.S. Patent Publication 2004/0154793 A1 is that the present invention uses substantially pure oxygen as the oxidation agent in the burners 500 of power turbine 520 instead of air. Use of oxygen ensures suitable carbon dioxide quality for reinjection in the hydrocarbon reservoir. Contaminants such as nitrogen or uncombusted hydrocarbons reduce the partial pressure of carbon dioxide so that an increased injection pressure is required to obtain the same carbon dioxide flood properties as substantially pure carbon dioxide. Kovarik F S, "A Minimum Miscibility Pressure Study Using Impure $CO_2$ and West Texas Oil Systems: Data Base, Correlations, and Compositional Simulation," Society of Petroleum Engineers Production Technology Symposium, November 1985. The initial cost and operating costs for the enhanced oil recovery process increases as additional equipment and energy is required to produce the higher carbon dioxide injection pressure. Therefore, an important component of the present invention is the use of substantially pure oxygen for oxidating agent in the burners 500, which thereby lowers the required carbon dioxide injection pressure, which results in the advantage of lower initial equipment costs for the system 300, 400 and lower operating costs for the system 300, 400.

Zapadinski, U.S. Patent Publication 2004/0154793 A1 further differs from system 300, 400 in that Zapadinski also does not disclose the use of low Btu gas in combination with IGCC technology for the burners 500 and power turbine 520 in the invention. The use of low Btu gas in combination with IGCC technology offers a significant operational and cost advantage.

Parrish, U.S. Pat. No. 4,344,486 discloses a method and system of enhanced recovery of hydrocarbons from underground reservoirs using carbon dioxide obtained by combusting a mixture of oxygen and produced gas from the underground reservoir. In Parrish, the exhaust gas is compressed and injected into the hydrocarbon reservoir. Parrish discloses a method whereby all of the produced carbon dioxide is reinjected in the underground reservoir for oil recovery and the cycle taught is a once-through process with no recirculation of carbon dioxide. In contrast, the present invention discloses a semi-closed combined cycle that recirculates a portion of the carbon dioxide and injects the remaining carbon dioxide in underground reservoirs for oil recovery. An important advantage of the present invention is the recycle of carbon dioxide and its use as a working fluid in the semi-closed combined cycle.

A number of embodiments of the invention have been described. Nevertheless, it will be understood that various modifications may be made without departing from the spirit and scope of the invention. Accordingly, other embodiments are within the scope of the following claims.

What is claimed is:

1. A system for processing a produced gas mixture of hydrocarbon and carbon dioxide gas produced from one or more hydrocarbon reservoirs and re-injection of at least a portion of the carbon dioxide component into at least one oil reservoir for the purposes of enhanced oil recovery from the at least one oil reservoir, said system comprising:
   a gas power turbine, said gas turbine having a burner adapted to burn the produced gas mixture of hydrocarbon gas and carbon dioxide as a fuel gas with substantially pure oxygen as an oxidizing agent, said fuel gas having a heating value of less than 500 Btu/scf;
   a capture system for capturing exhaust gas from the gas power turbine, said exhaust gas including a carbon dioxide component from the original produced gas mixture used as the fuel gas and a second carbon dioxide component formed as a product of the oxidation of the oxygen and a hydrocarbon component of the fuel gas;
   an inlet compressor, said inlet compressor receiving at least a portion of the exhaust gas from the capture system as a working fluid and compressing the captured exhaust gas, wherein at least a portion of the compressed captured exhaust gas from the inlet compressor is supplied to the burner of the gas power turbine and at least a portion of the compressed captured exhaust gas is for injection into the at least one oil reservoir; and
   a heat exchanger adapted to receive heat from the captured exhaust gas and transfer it to a stream of high-pressure power gas, wherein said stream of high-pressure power gas is then sent to a turbo expander engine used to drive an electric generator.

2. The system of claim 1 wherein the source of the high pressure power gas is nitrogen remaining after removal of oxygen from air in an air separation plant.

3. A system for processing a produced gas mixture of hydrocarbon and carbon dioxide gas produced from one or more hydrocarbon reservoirs and re-injection of at least a portion of the carbon dioxide component into at least one oil reservoir for the purposes of enhanced oil recovery from the at least one oil reservoir, said system comprising:
   a gas power turbine, said gas turbine having a burner adapted to burn the produced gas mixture of hydrocarbon gas and carbon dioxide as a fuel gas with substantially pure oxygen as an oxidizing agent, said fuel gas having a heating value of less than 500 Btu/scf;
   a capture system for capturing exhaust gas from the gas power turbine, said exhaust gas including a carbon dioxide component from the original produced gas mixture used as the fuel gas and a second carbon dioxide component formed as a product of the oxidation of the oxygen and a hydrocarbon component of the fuel gas;
   an inlet compressor, said inlet compressor receiving at least a portion of the exhaust gas from the capture system as a working fluid and compressing the captured exhaust gas, and wherein at least a portion of the compressed captured exhaust gas from the inlet compressor is supplied to the burner of the gas power turbine and at least a portion of the compressed captured exhaust gas is for injection into at least one oil reservoir; and
   a membrane system upstream of the inlet to the gas power turbine, wherein said membrane removes at least a portion of carbon dioxide and hydrogen sulfide from the produced gas mixture before said produced gas mixture is used for fuel gas in the gas power turbine.

4. The system of claim 3 wherein the portion of carbon dioxide and hydrogen sulfide removed by the membrane system is combined with the captured exhaust gas for injection of the combined stream into at least one hydrocarbon reservoir.

5. The system of claim 3 further including:
   a first electric generator driven by the gas power turbine.

6. The system of claim 3 further including:
   at least one gas injection compressor receiving at least a portion of the captured exhaust gas as working fluid for compression and injection into at least one oil reservoir.

7. A method for conducting a carbon dioxide enhanced hydrocarbon recovery process comprising the steps of:
   (a) providing produced gas from one or more hydrocarbon reservoirs, said produced gas containing a hydrocarbon gas component and a carbon dioxide component, said carbon dioxide component at least 50 mol %;
   (b) processing the produced gas through a membrane system to remove at least a portion of the carbon dioxide and hydrogen sulfide components;
   (c) providing substantially pure oxygen, oxygen component at least 90 mol %;
   (d) combusting the produced gas as fuel in a burner in a gas power turbine with a stoichiometric excess amount of oxygen for substantially complete combustion;
   (e) collecting the exhaust gas from combustion of the produced gas in the burner in a gas power turbine, said collected exhaust gas being greater than 90 mol % carbon dioxide, said collected exhaust gas carbon dioxide component comprising:
      a first uncombusted carbon dioxide component present in the produced gas provided as fuel to the gas power turbine, and
      a second carbon dioxide component formed by the combustion of the hydrocarbon component of the produced gas provided as fuel to the gas power turbine;
   (f) compressing the collected exhaust gas in at least one inlet compressor; and
   (g) providing at least a portion of the compressed collected exhaust gas to the burner of the gas power turbine and providing at least a portion of the compressed collected exhaust gas for injection into at least one oil reservoir; and
   (h) mixing said removed carbon dioxide portion and hydrogen sulfide portion from the membrane system with the collected exhaust gas from the gas power turbine prior to injection into the at least one oil reservoir.

8. The method of claim 7 further including the step:
   providing at least a portion of the compressed collected exhaust gas to at least one gas injection compressor for compression and injection into the at least one oil reservoir.

9. The method of claim 7 further including the step:
   driving at least one gas injection compressor with the gas power turbine.

10. The method of claim 7 further including the step:
   driving at least one gas injection compressor with electricity generated by an electric generator being driven by the gas power turbine.

11. The method of claim 7 further including the steps:
recovering heat from the collected exhaust gas and using said heat to create steam;
driving a steam turbine with said steam; and
driving an electric generator with said steam turbine.

12. The method of claim 7 further including the steps:
driving the inlet gas compressor with the gas power turbine.

13. The method of claim further including the step of:
further compressing the compressed gas using one or more stages of additional compression that may be powered by electricity from at least one electric generator.

14. The method of claim 7 further including the step:
driving the inlet compressor with electricity generated by an electric generator.

15. The method of claim 7 wherein the step of
processing the produced gas through a membrane system to remove a portion of the carbon dioxide and hydrogen sulfide components increases the Btu/scf of produced gas exiting the membrane system, said produced gas exiting the membrane system being used as the fuel gas for the gas power turbine.

16. The method of claim 7 further including the steps of:
controlling at least one non-dimensional parameter of the inlet compressor and/or power turbine by at least one of:
adjusting the water content of the exhaust gas that is received by the inlet compressor,
adjusting the temperature and composition of the combustion gas working fluid in the power turbine by steam injection,
adjusting the rotational speed of the inlet compressor and/or the power turbine.

17. The method of claim 7 further including the step:
powering an air separation plant that provides the oxygen with electric power generated by a generator.

18. The method of claim 7 further including the steps:
recovering heat from the collected exhaust gas and using said heat to create steam; and
injecting at least a portion of said steam directly into the gas power turbine in order to increase its power output.

19. The method of claim 7 further including:
driving at least one inlet compressor with the gas power turbine.

20. The method of claim 7 further including the step:
driving an electric generator with the gas power turbine.

21. A system for processing a produced gas mixture of hydrocarbon and carbon dioxide gas produced from one or more hydrocarbon reservoirs and re-injection of at least a portion of the carbon dioxide component into at least one oil reservoir for the purposes of enhanced oil recovery from the at least one oil reservoir, said system comprising:
a gas power turbine, said gas turbine having a burner adapted to burn the produced gas mixture of hydrocarbon gas and carbon dioxide as a fuel gas with substantially pure oxygen as an oxidizing agent, said fuel gas having a heating value of less than 500 Btu/scf;
a capture system for capturing exhaust gas from the gas power turbine, said exhaust gas including a carbon dioxide component from the original produced gas mixture used as the fuel gas and a second carbon dioxide component formed as a product of the oxidation of the oxygen and a hydrocarbon component of the fuel gas;
an inlet compressor, said inlet compressor receiving at least a portion of the exhaust gas from the capture system as a working fluid and compressing the captured exhaust gas, and wherein at least a portion of the compressed captured exhaust gas from the inlet compressor is supplied to the burner of the gas power turbine and at least a portion of the compressed captured exhaust gas is for injection into the at least one oil reservoir; and
a control system adapted to adjust the composition of the exhaust gas received by the inlet compressor,
said control system including:
a variable temperature condenser to remove water from the exhaust gas that is received by the inlet compressor such that one or more non-dimensional parameters of the inlet compressor with the exhaust gas as a working fluid approximate the non-dimensional parameters of the inlet compressor with air as a working fluid.

22. A system for processing a produced gas mixture of hydrocarbon and carbon dioxide gas produced from one or more hydrocarbon reservoirs and re-injection of at least a portion of the carbon dioxide component into at least one oil reservoir for the purposes of enhanced oil recovery from the at least one oil reservoir, said system comprising:
a gas power turbine, said gas turbine having a burner adapted to burn the produced gas mixture of hydrocarbon gas and carbon dioxide as a fuel gas with substantially pure oxygen as an oxidizing agent, said fuel gas having a heating value of less than 500 Btu/scf;
a capture system for capturing exhaust gas from the gas power turbine, said exhaust gas including a carbon dioxide component from the original produced gas mixture used as the fuel gas and a second carbon dioxide component formed as a product of the oxidation of the oxygen and a hydrocarbon component of the fuel gas;
an inlet compressor, said inlet compressor receiving at least a portion of the exhaust gas from the capture system as a working fluid and compressing the captured exhaust gas, and wherein at least a portion of the compressed captured exhaust gas from the inlet compressor is supplied to the burner of the gas power turbine and at least a portion of the compressed captured exhaust gas is for injection into the at least one oil reservoir; and
a control system adapted to adjust the composition of the combustion gas received by the power turbine, said control system including:
variable steam injection into the power turbine to modify the temperature and composition of the combustion gas received by the power turbine such that the non-dimensional parameters of the power turbine with the combustion gas as a working fluid approximate the non-dimensional parameters of the power turbine with air as a working fluid.

23. A method for conducting a carbon dioxide enhanced hydrocarbon recovery process comprising:
providing produced gas from one or more hydrocarbon reservoirs, said produced gas containing a hydrocarbon gas component and a carbon dioxide component, said carbon dioxide component at least 50 mol %;
providing substantially pure oxygen, said oxygen component at least 90 mol %;
combusting the produced gas as fuel in a burner in a gas power turbine with a stoichiometric excess amount of oxygen for substantially complete combustion;
collecting the exhaust gas from combustion of the produced gas in the burner in a gas power turbine, said collected exhaust gas being greater than 90 mol % carbon dioxide, said collected exhaust gas carbon dioxide component comprising:
a first uncombusted carbon dioxide component present in the produced gas provided as fuel to the gas power turbine, and a second carbon dioxide component formed by the combustion of the hydrocarbon component of the produced gas provided as fuel to the gas power turbine;

compressing the collected exhaust gas in at least one inlet compressor;

providing at least a portion of the compressed collected exhaust gas to the burner of the gas power turbine and providing at least a portion of the compressed collected exhaust gas for injection into the at least one oil reservoir; and controlling one or more non-dimensional parameters of the inlet compressor by passing the exhaust gas through a condenser and adjusting the temperature of the exhaust gas in said condenser to control water content of said exhaust gas that is received as a working fluid by the inlet compressor wherein the non-dimensional parameters of the inlet compressor approximate the non-dimensional parameters of the inlet compressor with air as a working fluid.

24. A method for conducting a carbon dioxide enhanced hydrocarbon recovery process comprising:

providing produced gas from one or more hydrocarbon reservoirs, said produced gas containing a hydrocarbon gas component and a carbon dioxide component, said carbon dioxide component at least 50 mol %;

providing substantially pure oxygen, said oxygen component at least 90 mol %;

combusting the produced gas as fuel in a burner in a gas power turbine with a stoichiometric excess amount of oxygen for substantially complete combustion;

collecting the exhaust gas from combustion of the produced gas in the burner in a gas power turbine, said collected exhaust gas being greater than 90 mol % carbon dioxide, said collected exhaust gas carbon dioxide component comprising:

a first uncombusted carbon dioxide component present in the produced gas provided as fuel to the gas power turbine, and a second carbon dioxide component formed by the combustion of the hydrocarbon component of the produced gas provided as fuel to the gas power turbine;

compressing the collected exhaust gas in at least one inlet compressor;

providing at least a portion of the compressed collected exhaust gas to the burner of the gas power turbine and providing at least a portion of the compressed collected exhaust gas for injection into the at least one oil reservoir; and controlling one or more non-dimensional parameters of the power turbine by injecting steam into the power turbine to adjust the temperature and composition of the combustion gas as a working fluid wherein the non-dimensional parameters of the power turbine approximate the non-dimensional parameters of a power turbine with air as a working fluid.

25. A method for conducting a carbon dioxide enhanced hydrocarbon recovery process comprising:

providing produced gas from one or more hydrocarbon reservoirs, said produced gas containing a hydrocarbon gas component and a carbon dioxide component, said carbon dioxide component at least 50 mol %;

providing substantially pure oxygen, said oxygen component at least 90 mol %;

combusting the produced gas as fuel in a burner in a gas power turbine with a stoichiometric excess amount of oxygen for substantially complete combustion;

collecting the exhaust gas from combustion of the produced gas in the burner in a gas power turbine, said collected exhaust gas being greater than 90 mol % carbon dioxide, said collected exhaust gas carbon dioxide component comprising:

a first uncombusted carbon dioxide component present in the produced gas provided as fuel to the gas power turbine, and a second carbon dioxide component formed by the combustion of the hydrocarbon component of the produced gas provided as fuel to the gas power turbine;

compressing the collected exhaust gas in at least one inlet compressor;

providing at least a portion of the compressed collected exhaust gas to the burner of the gas power turbine and providing at least a portion of the compressed collected exhaust gas for injection into the at least one oil reservoir; and controlling the flow of exhaust gas to the inlet compressor during transient conditions by removing low pressure carbon dioxide upstream of the inlet compressor.

26. A method for conducting a carbon dioxide enhanced hydrocarbon recovery process comprising:

providing produced gas from one or more hydrocarbon reservoirs, said produced gas containing a hydrocarbon gas component and a carbon dioxide component, said carbon dioxide component at least 50 mol %;

providing substantially pure oxygen, said oxygen component at least 90 mol %;

combusting the produced gas as fuel in a burner in a gas power turbine with a stoichiometric excess amount of oxygen for substantially complete combustion;

collecting the exhaust gas from combustion of the produced gas in the burner in a gas power turbine, said collected exhaust gas being greater than 90 mol % carbon dioxide, said collected exhaust gas carbon dioxide component comprising:

a first uncombusted carbon dioxide component present in the produced gas provided as fuel to the gas power turbine, and a second carbon dioxide component formed by the combustion of the hydrocarbon component of the produced gas provided as fuel to the gas power turbine;

compressing the collected exhaust gas in at least one inlet compressor;

providing at least a portion of the compressed collected exhaust gas to the burner of the gas power turbine and providing at least a portion of the compressed collected exhaust gas for injection into the at least one oil reservoir; and rotating the inlet compressor at a different rotational speed than the rotational speed of the power turbine to independently control the non-dimensional parameters of the inlet compressor and the power turbine.

* * * * *

UNITED STATES PATENT AND TRADEMARK OFFICE
CERTIFICATE OF CORRECTION

PATENT NO. : 7,654,320 B2
APPLICATION NO. : 11/726597
DATED : February 2, 2010
INVENTOR(S) : Thomas J. Payton It is certified that error appears in the above-identified patent and that said Letters Patent is hereby corrected as shown below:

Title Page; Item (56);

Page 2, References Cited, Other Publications, Column 1, Line 47 – replace "turbinescc" with -- turbines_cc --

Page 2, References Cited, Other Publications, Column 2, Line 48 – replace "Advanced" with -- Advances --

Page 2, References Cited, Other Publications, Column 2, Line 67 – replace "Compresssor" with -- Compressor --

Page 3, References Cited, Other Publications, Column 1, Line 3 – replace "91/7894-135-1" with -- 91-7894-135-1 --

Page 3, References cited, Other Publications, Column 1, Line 8 – replace "O2/Co2" with -- $O_2/CO_2$ --

Page 3, References cited, Other Publications, Column 1, Line 8 – replace "Co2" with -- $CO_2$ --

Page 3, References Cited, Other Publications, Column 1, Line 13 – replace "91/7170-540-6" with -- 91-7170-540-6 --

Page 3, References Cited, Other Publications, Column 1, Line 52 – replace "T'URPO" with -- TURBO --

In Column 6, Line 43 – replace "It)" with -- 10 --

In Column 6, Line 59 – replace "of." with -- of, --

In Column 8, Line 37 – replace "Homback" with -- Hornback --

Signed and Sealed this

Eleventh Day of May, 2010

David J. Kappos
*Director of the United States Patent and Trademark Office*

In Column 8, Line 40 – replace "Homback" with -- Hornback --

In Column 12, Line 45 – replace "oxidating" with -- oxidizing --

In Claim 3, Column 13, Line 51 – after "gas" insert -- power --

In Claim 7, Column 14, Line 28 – after "oxygen," insert -- said --

In Claim 7, Column 14, Line 45 – after "compressor;" delete -- and --

In Claim 12, Column 15, Line 6 – replace "steps" with -- step --

In Claim 13, Column 15, Line 9 – after "claim" insert -- 7 --

In Claim 15, Column 15, Line 16 – replace "step of" with -- step: --

In Claim 16, Column 15, Line 23 – after "steps" delete "of"

In Claim 16, Column 15, Line 27 – after "compressor" replace "," with -- ; --

In Claim 16, Column 15, Line 29 – before "power" insert -- gas --

In Claim 16, Column 15, Line 30 – after ";" insert -- and --

In Claim 16, Column 15, Line 32 – before "power" insert -- gas --

In Claim 21, Column 15, Line 52 – after "gas" insert -- power --

In Claim 22, Column 16, Line 20 – after "gas" insert -- power --

In Claim 22, Column 16, Line 40 – before "power" insert -- gas --

In Claim 22, Column 16, Line 42 – before "power" insert -- gas --

In Claim 22, Column 16, Line 44 – before "power" insert -- gas --

In Claim 22, Column 16, Line 45 – before "power" insert -- gas --

In Claim 22, Column 16, Line 47 – before "power" insert -- gas --

In Claim 23, Column 16, Line 61 – replace "a" with -- the --

In Claim 24, Column 17, Line 32 – replace "a" with -- the --

In Claim 24, Column 17, Line 50 – before "power" insert -- gas --

In Claim 24, Column 17, Line 50 – before "power" insert -- gas --

CERTIFICATE OF CORRECTION (continued)
U.S. Pat. No. 7,654,320 B2

In Claim 24, Column 17, Line 53 – before "power" insert -- gas --

In Claim 24, Column 17, Line 54 – before "power" insert -- gas --

In Claim 25, Column 18, Line 7 – replace "a" with -- the --

In Claim 26, Column 18, Line 39 – replace "a" with -- the --

In Claim 26, Column 18, Line 57 – before "power" insert -- gas --

In Claim 26, Column 18, Line 29 – before "power" insert -- gas --